UNITED STATES PATENT OFFICE.

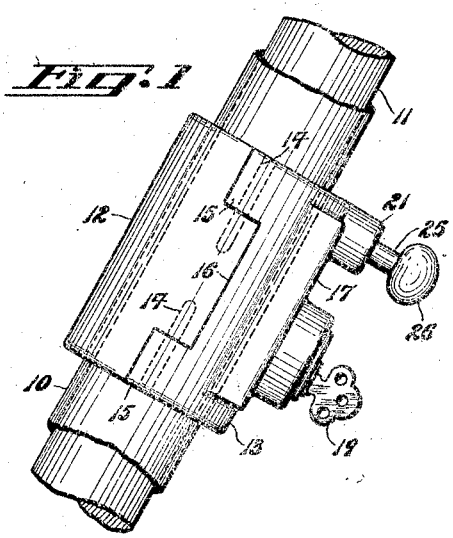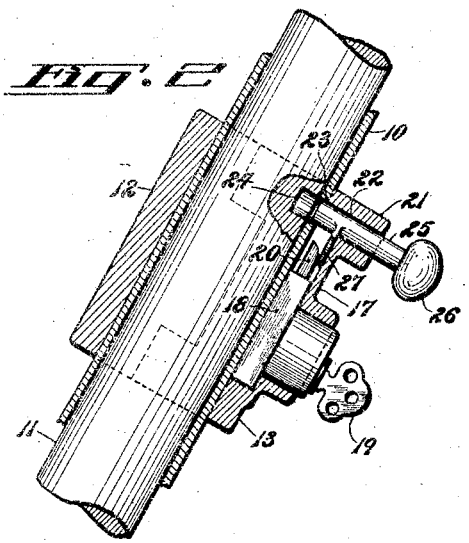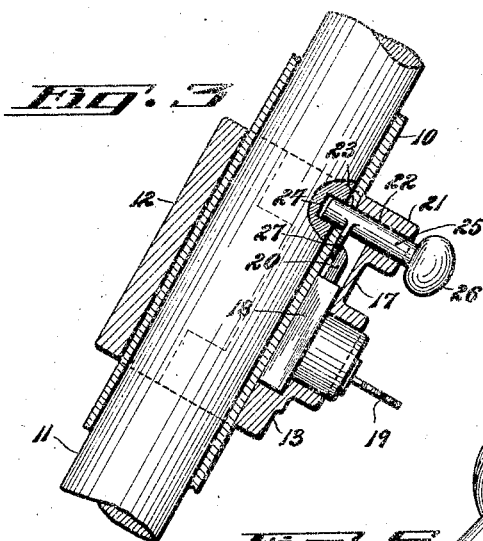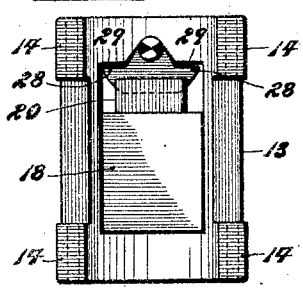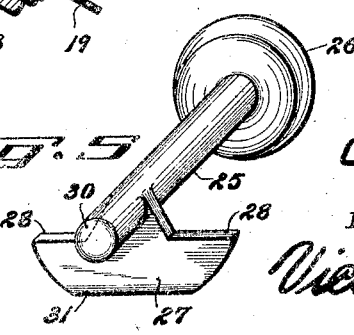

GEORGE F. SMITH, OF GERMANTOWN, PENNSYLVANIA.

AUTOMOBILE-LOCK.

1,377,100. Specification of Letters Patent. Patented May 3, 1921.

Application filed October 18, 1919. Serial No. 331,563.

*To all whom it may concern:*

Be it known that I, GEORGE F. SMITH, a citizen of the United States, residing at Germantown, in the county of Philadelphia and State of Pennsylvania, have invented new and useful Improvements in Automobile-Locks, of which the following is a specification.

This invention relates to automobile locks and it has more particular reference to that type of device which is adapted to be mounted at a convenient point upon the steering column of an automobile for engagement with the steering shaft.

The main object of this invention is to provide an automobile locking device for locking the steering shaft whereby tampering with the machine by unauthorized persons during the absence of the owner is rendered impossible.

A further object of the invention is to provide an automobile lock, the locking element proper whereof is so positioned that it cannot be accidentally moved into locked position by undue vibration or jolting of the machine when running over uneven surfaces.

Another object of this invention is to provide an automobile lock which when once mounted on the steering column is of such a nature that illicit tampering with the mechanism thereof or the improper removal of the entire device is made practically impossible.

A still further object of the invention is to provide a locking device of the nature referred to which comprises few working parts which are easily operated and not likely to call for frequent repair or renewal.

With these and other objects in view my invention consists essentially in the novel features of construction, combination and arrangement of parts hereinafter fully described and more specifically defined by the appended claims.

In the further disclosure of the invention reference is to be had to the accompanying sheet of drawings, constituting a part of this specification and in which like parts are designated by the same characters of reference throughout the several views.

Figure 1— is a fragmentary side elevation of a portion of an automobile steering column and steering shaft having my improved lock applied thereto and shown in unlocked position.

Fig. 2— is a vertical longitudinal section of the same and illustrating the device in unlocked position.

Fig. 3— is a similar longitudinal section with the device shown in locked position.

Fig. 4— is an inside face view of that part of the device containing the locking mechanism proper; and Fig. 5— is an enlarged perspective view of the locking element hereinafter more particularly referred to.

Referring to the drawings the numeral 10 designates the steering column of an automobile and 11, the steering shaft thereof, it of course being understood that the latter is freely rotatable in the former and adapted for manipulation by the customary steering wheel—not shown. Adapted to fit snugly to the steering column 10, is a composite sleeve including opposed sections 12, 13, adapted for interlocking connection by pins 14 passing through ears 15, on the section 13 into an ear 16 on the section 12. Formed integral with the aforesaid section 13 is a housing 17, in which is firmly bedded and secured a suitable lock 18, adapted to be operated by an appropriate key 19, said lock 18 being of an approved make and including a bolt 20 which is normally held in projected or locked position and adapted to be retracted by manipulation of the key 19.

At right angles to the axis of the steering shaft 11, and projecting outwardly from the housing 17, I form a boss 21, provided with a bore 22 adapted to register with correspondingly shaped holes 23, 24, in the steering column 10 and steering shaft 11, respectively it being particularly noted that the hole 24 is only of sufficient depth to sufficiently receive the inner end of the locking element 25 and thereby securely lock said steering shaft 11 against further movement when the machine is left unattended or is at a standstill.

The locking element 25, is provided with a knob 26 at its outer end and a pendant blade or depending flange 27 having shoulders 28 seating beneath the upper wall 29, of the housing 17, said shoulders serving to prevent the element 25 from turning as well as guiding same in its longitudinal movement. From an inspection of the drawings it will be readily seen that the flange 27 is formed on the element 25 at a suitable distance from the inner end 30 thereof so that when the parts are in unlocked relation as shown clearly in Fig. 2, the end 30 of the element 25 projects slightly into the hole 23 in the steering column 10 and the flange 27 lies at the back of the lock bolt 20. On the other hand it will also be seen on an inspection of Fig. 3 that when the parts are in locked relation the end 30 of the locking element 25 projects into the registering hole 24 of the steering shaft 11 to lock same against turning movement while the flange 27 lies snugly between the forward face of the lock bolt 20 and the outer peripheral surface of the steering column 10 and in order to insure the parts 27, 20, riding over one another from unlocked to locked relation the upper rear edge of the bolt 20 is rounded off as shown while the lower forward edge of the flange 27 is similarly rounded off or chamfered at 31, Fig. 5.

The operation of my improved locking device for automobiles is briefly as follows: Assuming the machine is to be parked or left unattended, the steering shaft 11 is turned to bring the holes 24, 23, into register whereupon pressure or a sharp blow is applied to the knob 26, which causes the locking element, 25, to be forwardly projected, and the flange 27, to ride over the rounded end of the lock bolt 20, the latter being downwardly forced thereby until said flange has passed thereover whereupon said lock bolt 20 is automatically sprung upwardly to the position shown in Fig. 3 while the end 30 of the element 25 is thereby held in firm locking engagement with respect to the steering column 10 and steering shaft 11. To unlock the parts, the key 19 is inserted in the lock 18 and given the necessary turn to retract the bolt 20, whereupon the locking element 25 slides outwardly by gravity—or may be retracted by a pull on the knob 26—to the unlocked position.

Obviously the hole 24 may be positioned in the steering shaft so that the forward wheels of the automobile will be turned at an angle relative to the rear wheels thereof, and thereby preventing the illicit hauling away of the vehicle. Furthermore an indicator or other means may be associated with the steering wheel to show at a glance when the holes 23, 24, are in proper register.

From the foregoing description it will be readily seen that my improved lock for automobiles is simple in construction, can be easily and readily applied to the steering column 10 and when in use effectually prevents any turning movement of the steering shaft 11 whereby any tampering with the machine, or the theft thereof when left unattended, is effectively prevented. Furthermore it will be conceded that my improved automobile lock may be manufactured at small cost and is extremely durable and efficient in use.

While I have particularly described and shown a preferred embodiment of the invention I wish it understood that I do not limit myself to the precise details or application thereof hereinbefore set forth, but consider myself at liberty to make such changes in the shape and other arrangements of the parts as will adapt my said invention to analogous uses, such changes and other arrangements however being limited to the scope of the appended claims.

Having described my invention what I claim as new and desire to secure by Letters Patent, is:—

1. In a locking device of the character described the combination with a recessed rotatable shaft and its surrounding casing having a passage therein adapted to be brought into register with the recess when it is desired to relatively lock said parts, of a composite sleeve including opposed interlocking sections adapted for clamping engagement on the casing, a housing on one part of the composite sleeve, a lock in said housing and having the bolt thereof normally projected, and a slidable element disposed at right angles to the lock bolt and having a pendant flange provided with lateral ears for preventing its rotation, said slidable element being adapted for operation over the lock bolt from unlocked position into locking engagement relative to the rotatable shaft and its surrounding casing.

2. A locking device for attachment to the steering column of an automobile and the steering shaft thereof comprising a sleeve including opposed interlocking sections adapted for clamping engagement on the steering column, a housing integral with one of the interlocking sections, a lock in said housing and having the bolt thereof normally projected, means for retracting said bolt when desired, and a slidable element disposed at right angles to the lock bolt and having a pendant flange provided with lateral ears for coöperation with a wall of the housing to prevent said slidable element from rotation, the pendant flange of said slidable element being adapted for movement over the lock bolt to move the same from unlocked position into locking engagement with the steering shaft relative to the steering column.

In testimony whereof I affix my signature.

GEORGE F. SMITH.